United States Patent
Feng et al.

(10) Patent No.: US 12,181,772 B2
(45) Date of Patent: Dec. 31, 2024

(54) OPTICAL SWITCH DEVICE CONFIGURED FOR TOPOLOGICAL LIGHT STEERING AND RELATED METHODS

(71) Applicant: The Trustees of the University of Pennsylvania, Philadelphia, PA (US)

(72) Inventors: Liang Feng, Wynnewood, PA (US); Han Zhao, Philadelphia, PA (US)

(73) Assignee: THE TRUSTEES OF THE UNIVERSITY OF PENNSYLVANIA, Philadelphia, PA (US)

( * ) Notice: Subject to any disclaimer, the term of this patent is extended or adjusted under 35 U.S.C. 154(b) by 269 days.

(21) Appl. No.: 17/642,396

(22) PCT Filed: Sep. 14, 2020

(86) PCT No.: PCT/US2020/050707
§ 371 (c)(1),
(2) Date: Mar. 11, 2022

(87) PCT Pub. No.: WO2021/091617
PCT Pub. Date: May 14, 2021

(65) Prior Publication Data
US 2022/0357631 A1    Nov. 10, 2022

Related U.S. Application Data

(60) Provisional application No. 62/899,451, filed on Sep. 12, 2019.

(51) Int. Cl.
*G02F 1/313* (2006.01)
(52) U.S. Cl.
CPC ........ *G02F 1/313* (2013.01); *G02F 2202/102* (2013.01); *G02F 2203/24* (2013.01)

(58) Field of Classification Search
CPC ................................................. G02F 2202/102
See application file for complete search history.

(56) References Cited

U.S. PATENT DOCUMENTS 6,195,187 B1 * 2/2001 Soref ................. G02B 6/29395
398/9
7,496,257 B2 * 2/2009 Levner ............... G02B 6/02085
385/37

(Continued)

FOREIGN PATENT DOCUMENTS

CN        109951180 A  *  6/2019

OTHER PUBLICATIONS

Bahari et al., "Nonreciprocal lasing in topological cavities of arbitrary geometries," Science 358, 636-640 (2017).
(Continued)

*Primary Examiner* — Rhonda S Peace
(74) *Attorney, Agent, or Firm* — Jenkins, Taylor & Hunt, P.A.

(57) ABSTRACT

An optical switch device and a related method for defining a topological light transport channel in a photonic lattice are provided. An exemplary optical switch device includes a photonic lattice including a photonic topological microring array comprising a plurality of site rings coupled via a plurality of anti-resonant link rings, a plurality of input light ports and a plurality of output light ports located at the plurality of site rings, wherein the plurality of input light ports and the plurality of output light ports are respectively connected by a plurality of topological light transport channels. The optical switch device is further configured such that each of the topological light transport channels is defined by a gain domain area that is produced by a corresponding patterned optical pumping beam emitted onto the photonic topological microring array.

12 Claims, 8 Drawing Sheets

(56) References Cited

U.S. PATENT DOCUMENTS

| | | | |
|---|---|---|---|
| 9,052,448 B2* | 6/2015 | Hafezi | G02B 6/29331 |
| 10,725,131 B2* | 7/2020 | Clerk | H03F 3/20 |
| 11,283,244 B2* | 3/2022 | Segev | H01S 5/041 |
| 11,340,514 B2* | 5/2022 | Mittal | G02F 1/365 |
| 11,569,631 B2* | 1/2023 | Kante | H01S 5/4025 |
| 11,599,006 B2* | 3/2023 | Mittal | G02F 1/3536 |
| 2018/0252527 A1 | 9/2018 | Khajavikhan et al. | |
| 2018/0261977 A1 | 9/2018 | Feng et al. | |
| 2018/0306696 A1 | 10/2018 | Ozdemir et al. | |
| 2020/0119524 A1* | 4/2020 | Segev | H01S 5/1021 |
| 2022/0352691 A1* | 11/2022 | Ma | H01S 5/041 |
| 2022/0357631 A1* | 11/2022 | Feng | G02F 1/313 |
| 2023/0223735 A1* | 7/2023 | Segev | H01S 5/0014 372/75 |
| 2023/0350270 A1* | 11/2023 | Merlo-Ramirez | G02F 1/3136 |

OTHER PUBLICATIONS

Bandres et al., "Topological insulator laser: Experiments," Science 359, (Mar. 16, 2018).

Barik et al., "A topological quantum optics interface," Science 359, 666-668 (2018).

Blanco-Redondo, et al., "Topological protection of biphoton states," Science 362, 568571 (Nov. 2, 2018).

Cheng et al., "Robust reconfigurable electromagnetic pathways within a photonic topological insulator," Nat. Mater. 15, 542-548 (2016).

J.-W. Dong, et al., Valley photonic crystals for control of spin and topology, Nat. Mater. 16, 298-302 (2017).

J. Doppler et al., "Dynamically encircling an exceptional point for asymmetric mode switching," Nature 537, 76-79 (2016).

Feng, R. El-Ganainy, L. Ge, "Non-Hermitian photonics based on parity-time Symmetry," Nat. Photonics 11, 752-762 (2017).

Hafezi et al., "Robust optical delay lines with topological protection," Nat. Phys. vol. 7, pp. 907-912 (2011).

Hafezi, et al., "Imaging topological edge states in silicon photonics," Nat. Photonics vol. 7, 1001-1005 (Dec. 2013).

Jung, et al., "Midinfrared Plasmonic Valleytronics in Metagate-Tuned Graphene," Phys. Rev. Lett. 121, 086807 (2018).

Khanikaev et al., "Photonic topological insulators," Nat. Mater. 12, 233-239 (2013).

Klembt et al., "Exciton-polariton topological insulator," Nature 562, 552-556 (Oct. 25, 2018).

Kudyshev, et al. "Photonic topological phase transition on demand," Nanophotonics 8, 1349-1356 (2019).

Leykam, et al., "Reconfigurable topological phases in next-nearest-neighbor coupled resonator lattices," Physics.optics (Jul. 14, 2018).

Leykam, et al., "Edge Modes, Degeneracies, and Topological Numbers in Non-Hermitian Systems," Phys. Rev. Lett. 118, 040401 (Jan. 27, 2017).

Mittal, et al., "A topological source of quantum light," Nature 561, pp. 502-506 (Sep. 27, 2018).

Ozawa et al., "Topological photonics," Rev. Mod. Phys. 91, 015006 (Jan.-Mar. 2019).

Peng et al., "Parity-time-symmetric whispering-gallery microcavities," Nat. Phys. 10, 394-398 (2014).

Poli, et al., "Selective enhancement of topologically induced interface states in a dielectric resonator chain," Nat. Commun. 6, 6710 (Apr. 2, 2015).

Rechtsman et al., "Photonic Floquet topological insulators," Nature 496, 196-200 (2013).

Shalaev, et al, "Robust topologically protected transport in photonic crystals at telecommunication wavelengths," Nat. Nanotechnol. 14, 31-34 (Jan. 2019).

Shalaev, W. Walasik, N. M. Litchinitser, "Optically tunable topological photonic crystal," Optica 6, 839 (2019).

St-Jean et al., "Lasing in topological edge states of a one-dimensional lattice," Nat. Photonics 11, 651-656 (Oct. 2017).

Takata, K. and M. Notomi, "Photonic Topological Insulating Phase Induced Solely by Gain and Loss," Phys. Rev. Lett. 121, 213902 (2018).

Yang et al., "Ideal Weyl points and helicoid surface states in artificial photonic crystal structures," Science 359, 1013-1016 (Mar. 2, 2018).

Zhou et al., Observation of bulk Fermi arc and polarization half charge from paired exceptional points, Science 359, 1009-1012 (Mar. 2, 2018).

Notification of Transmittal of the International Search Report and the Written Opinion of the International Searching Authority, or the Declaration for International Application No. PCT/US20/50707 (Jun. 17, 2021).

Zhao et al., "Non-Hermitian topological light steering," Science, vol. 365, pp. 1163-1166 (Sep. 13, 2019).

Zhao, "Non-Hermitian Topological Photonics: From Concepts to Applications," University of Pennsylvania, pp. 1-24 (2019).

Midya et al., "Non-Hermitian photonics promises exceptional topology of light," Nature Communications, pp. 1-4 (Jul. 2018).

* cited by examiner

OPTICAL SWITCH DEVICE CONFIGURED FOR TOPOLOGICAL LIGHT STEERING AND RELATED METHODS

PRIORITY CLAIM

This application claims the benefit of U.S. Provisional Patent Application Ser. No. 62/899,451, filed Sep. 12, 2019, the disclosure of which is incorporated herein by reference in its entirety.

GOVERNMENT INTEREST

This invention was made with government support under grant number W911NF-19-1-0249 awarded by U.S. Army Research Office and grant numbers ECCS-1846766, CMMI-1635026, and DMR-1720530 awarded by the National Science Foundation. The government has certain rights in the invention.

TECHNICAL FIELD

The subject matter described herein relates to topological photonic devices and associated light steering techniques. More particularly, the subject matter described herein relates to an optical switch device and a related method for defining a topological light transport channel in a photonic topological microring lattice.

BACKGROUND

Controlling the flow of light on demand is critical for the next generation of photonic integrated infrastructure to sustain the ever-expanding information explosion for data processing, communication, and computing. Nevertheless, state-of-the-art integrated transmission links to efficiently guide and route light suffer two fundamental challenges: crosstalk and disorder-induced scattering losses. Most current photonic switches and routers are based on cascaded Mach-Zehnder interferometers. With complex architectures that contain numerous crossing nodes, such designs lack flexibility, require a large footprint, and thus become vulnerable to defects and scattering losses, which make large-scale integrated photonic applications impractical.

Topological photonics is revolutionizing the design principles of photonic components that benefit from these challenges by topological protection and enable robust light transport. Photonic topological insulators are synthetic materials with a gapped bulk energy spectrum and protected in-gap chiral states appearing at the edge of the structure. Topological insulating phases are characterized by an integer topological invariant that has a global dependence on characteristic parameters of the system. If the topological invariant changes across an interface separating two materials, a topological state bound to the interface necessarily occurs, providing an energy-efficient one-way channel for electromagnetic transport. These one-way channels are topologically protected such that any defect and disorder cannot induce backscattering or transmission loss, enabling photonic components with topological protection ranging from waveguiding, resonance, and lasing in the classical regime to robust generation and propagation of single photons for quantum information.

Although topological photonics provides a solid foundation to efficiently guide, switch, and route light in integrated circuits, topological protection and reconfigurability will need to be combined for the next generation of integrated devices. Recent efforts have been devoted to the study of switching the topological phase for optical modulation, and some progress has been achieved in the microwave regime via mechanically controlled topological phase transition.

However, an effective synergy between topological guiding and ultra-flexible reconfigurability remains a challenge in optics. The redefinition of topological light pathways requires considerable perturbations to drive the topological phase transition inside the bulk structure, which is difficult to access in integrated photonic chips. Such a severe limitation prevents topological photonics from being practically applied, because the topological mode exists only at the static structural boundary so that most of the footprint of the photonic structure is unused.

SUMMARY

An optical switch device and a related method for defining a topological light transport channel in a photonic lattice are provided. An exemplary optical switch device includes a photonic lattice including a photonic topological microring array comprising a plurality of site rings coupled via a plurality of anti-resonant link rings, a plurality of input light ports and a plurality of output light ports located at the plurality of site rings, wherein the plurality of input light ports and the plurality of output light ports are respectively connected by a plurality of topological light transport channels. The optical switch device is further configured such that each of the topological light transport channels is defined by a gain domain area that is produced by a corresponding patterned optical pumping beam emitted onto the photonic topological microring array.

In one example of the optical switch device, the topological light transport channels can be dynamically changed by adjusting the patterned optical pumping beam that is emitted onto the photonic lattice.

In one example of the optical switch device, an optical pumping pattern produced by the emitted patterned optical pumping beam is dynamically configured by a spatial light modulator.

In one example of the optical switch device, an area on the photonic lattice that is not subjected to the optical pumping pattern results in a distributed loss domain.

In one example of the optical switch device, an arrangement of the coupled plurality of site rings coupled and plurality of anti-resonant link rings produces the topological feature of the topological light transport channels.

In one example of the optical switch device, the photonic topological microring array is composed of an Indium gallium arsenide phosphide (InGaAsP) material.

In one example of the optical switch device, non-Hermitian control is utilized to steer the topological light transport channel on the photonic lattice.

In some embodiments, an exemplary method for defining a topological light transport channel in a photonic lattice is provided. One method includes emitting a patterned optical pumping beam onto a photonic topological microring array of a photonic lattice, wherein the photonic topological microring array includes a plurality of site rings coupled via a plurality of anti-resonant link rings. The method also includes defining at the topological light transport channel at the periphery of the gain domain area resulting from an optical pumping pattern produced by the patterned optical pumping beam, wherein the topological light transport channel connects at least one input light port and at least one output light port of an optical switch device.

In one example of the method, the topological light transport channel is dynamically changed by adjusting the optical pumping pattern that is emitted onto the photonic lattice.

In one example of the method, the optical pumping pattern is dynamically configured by a spatial light modulator.

In one example of the method, an area on the photonic lattice that is not subjected to the optical pumping pattern results in a distributed loss domain.

In one example of the method, an arrangement of the coupled plurality of site rings coupled and plurality of anti-resonant link rings produces a topological feature of the topological light transport channel.

In one example of the method, the photonic topological microring array is composed of an Indium gallium arsenide phosphide (InGaAsP) material.

In one example of the method, wherein non-Hermitian control is utilized to steer the topological light transport channel on the photonic lattice.

BRIEF DESCRIPTION OF THE DRAWINGS

The subject matter described herein will now be explained with reference to the accompanying drawings of which.

DETAILED DESCRIPTION

The subject matter described herein relates to an optical switch device that is configured to conduct topological light steering by defining a topological light transport channel in a photonic topological microring lattice. Notably, photonic topological insulators provide a route for disorder-immune light transport, which holds promise for practical applications. For example, flexible reconfiguration of topological light pathways can enable high-density photonics routing, thus sustaining the growing demand for data capacity. By strategically interfacing non-Hermitian and topological physics, the disclosed subject matter demonstrates arbitrary, robust light steering in reconfigurable non-Hermitian junctions, in which chiral topological states can propagate at an interface of the gain and loss domains. The non-Hermitian-controlled topological state as disclosed below can enable the dynamic control of robust transmission links of light inside the bulk of the photonic topological microring lattice, thereby fully using the entire footprint of a photonic topological insulator.

In an attempt to avoid perturbing topological robustness of an insulator, the disclosed subject matter demonstrates the creation of a topological light transport channel via non-Hermitian control on an active photonic platform within the bulk of an otherwise Hermitian photonic topological insulator with uniform topological property. In some embodiments, the topological lattice includes coupled microring resonators supporting two topological nontrivial bandgaps on an Indium gallium arsenide phosphide (InGaAsP) multiple-quantum well platform for operation in the telecommunication band. In particular, non-Hermitian control can be conducted by optically pumping (e.g., using a spatial light modulator) the photonic lattice to create both a distributed gain domain (via external optical pumping) and a distributed loss domain (intrinsic material loss without optical pumping). Accordingly, the emergence of new topological states can be observed at the boundary existing between the gain domain and loss domain when the local non-Hermiticity (i.e., the gain-loss contrast) is driven across the exceptional point (EP) defined by the coalescing eigenstates. As a result, the associated phase transition induces two effectively detached topological states. Of these, one topological state becomes strongly attenuated in the loss domain, whereas the second topological state (of the gain domain) survives and enables new topological pathways for guiding light at the gain-loss domain boundary without any alteration of the global topological properties of the photonic lattice. Therefore, non-Hermitian control can be used to actively steer topological light on demand by projecting the designed spatial pumping patterns onto the photonic lattice. Consequently, guiding light from a spatial light modulator can be directed along any arbitrary pathway, thereby fully utilizing the entire footprint of the photonic lattice while topologically routing the optical signal to any desired output light port of the lattice.

Figure 1:
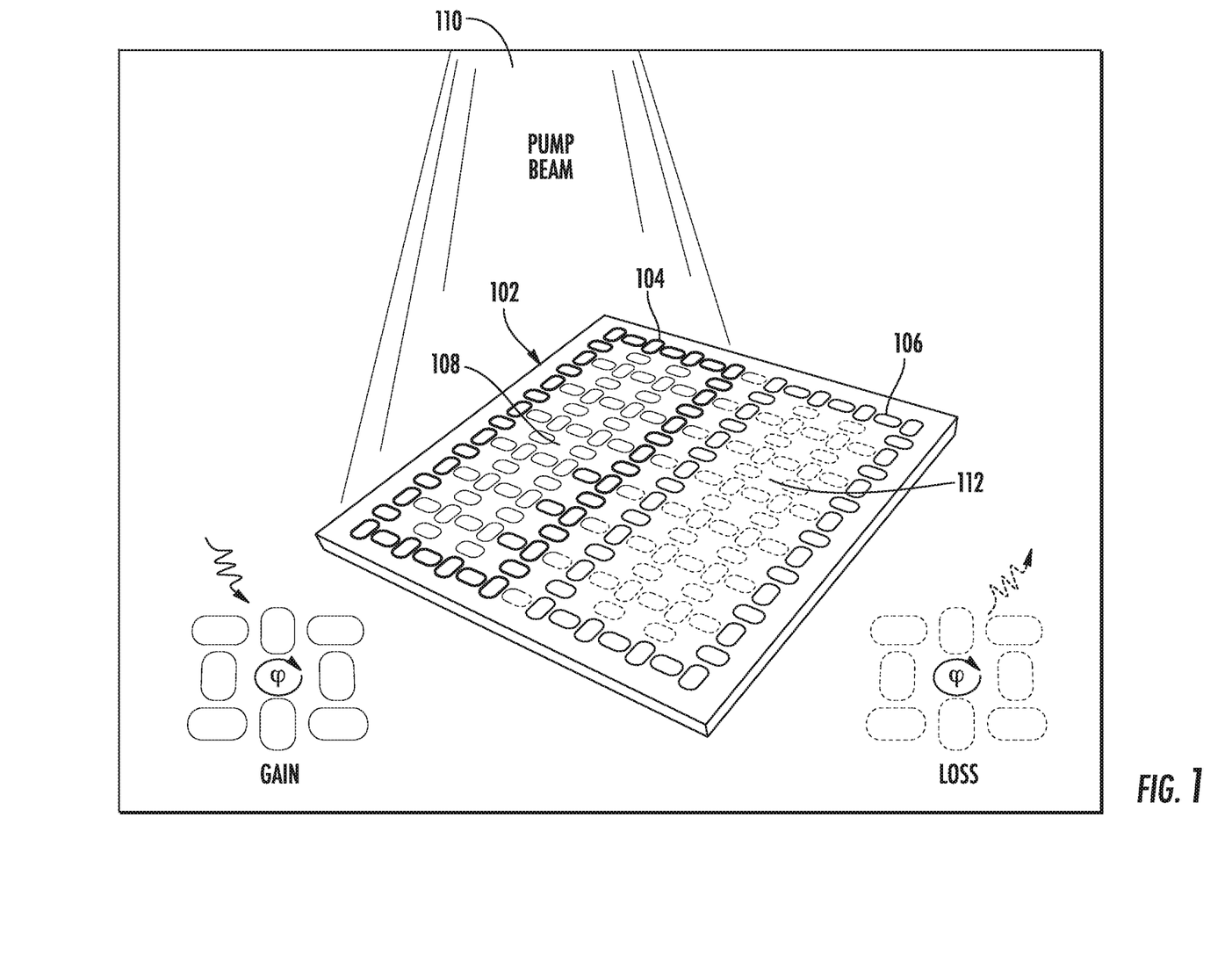
FIG. 1 is a schematic diagram depicting an exemplary photonic lattice including a photonic topological microring array of site rings and anti-resonant link rings according to an embodiment of the subject matter described herein.

FIG. 1 is a schematic diagram depicting an exemplary photonic lattice including a photonic topological microring array of site rings and anti-resonant link rings according to an embodiment of the subject matter described herein. For example, a non-Hermitian version of the two-dimensional (2D) photonic topological microring array comprising a square photonic lattice 102 made up of a plurality of site rings (e.g., site ring 106) coupled via a plurality of anti-resonant link rings (e.g., anti-resonant link ring 104) is considered. FIG. 1 further shows an optical pumping beam 110 that may be emitted by a spatial light modulator or some other optical pumping device (not shown). In some embodiments, each of the site rings 106 and the anti-resident link rings 104 is constructed using an Indium gallium arsenide phosphide (InGaAsP) material. Alternatively, other kinds of semiconductor quantum well materials that can achieve the similar functionality (e.g., providing gain when pumped and absorption when not pumped), such as aluminum gallium arsenide (AlGaAs), indium gallium arsenide (InGaAs), indium gallium arsenide nitride (InGaAsN) can be used to construct the site rings. Notably, the optical pumping beam 110 creates a topological light transport channel in the photonic lattice 102 by emitting light in area 108, which consequently creates a distributed gain domain. Likewise, the absence of light emitted from optical pumping beam 110 in area 112 creates a distributed loss domain due to intrinsic material loss.

Figure 2:
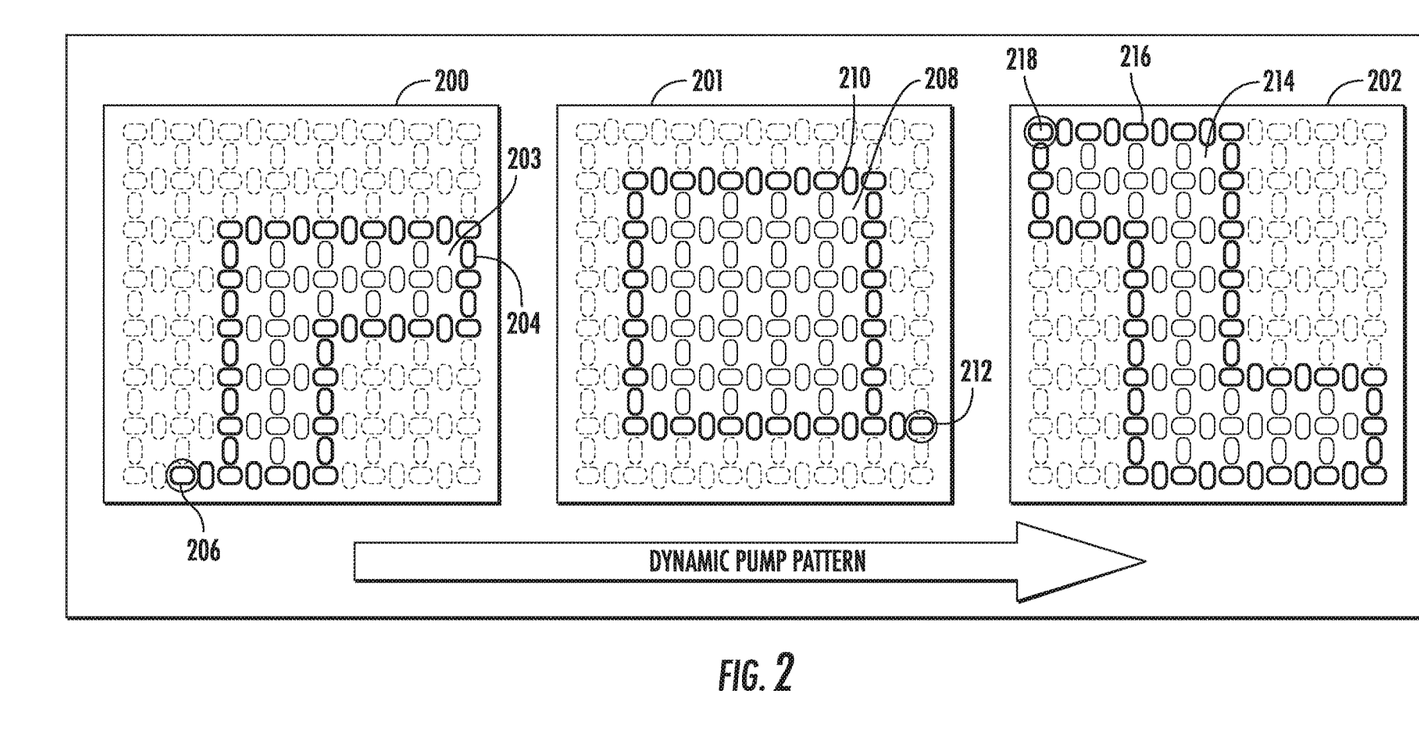
FIG. 2 is a schematic diagram that illustrates topological edge states that are dynamically configured to steer light according to an embodiment of the subject matter described herein.

FIG. 2 is a schematic diagram that illustrates topological edge states that are dynamically configured to steer light according to an embodiment of the subject matter described herein. In particular, FIG. 2 illustrates that topological edge states can be dynamically preconfigured to steer light along any boundary that is defined by the arbitrarily patterned optical pump beam. For example, a spatial light modulator can be configured to produce optical pump beam to produce an "L" shaped gain domain 203 shown in photonic lattice 200 (e.g., representing a photonic lattice with a microring array) during an initial first topological edge state. Photonic lattice 200 further shows that gain domain 203 is defined by a photonic channel 204 made by the microrings present at the border of the optical pump beam pattern. Further, such a pattern enables an operator of the spatial light modulator to establish an input light port 206 for the photonic lattice 200.

FIG. 2 further illustrates a subsequent stage (e.g., a second topological edge state) in the dynamic optical pumping such that the photonic lattice is subjected to a new pump beam pattern that produces a square shaped gain domain 208 (illustrated as "changed" or "reconfigured" photonic lattice 201). Photonic lattice 201 further shows that gain domain 208 is defined by a photonic channel 210 made by microrings present at the border of the optical pump beam pattern. Further, such a pattern enables an operator the spatial light modulator to establish an input light port 212 for photonic lattice 201 (note: any site ring in the photonic channel 210 can be designated as an output port). FIG. 2 also continues to depict the dynamic pumping pattern by depicting the photonic lattice being subjected to a third pattern (shown within a "reconfigured" photonic lattice 202) in a third topological edge state. Photonic lattice 202 shows a gain domain 214 that is defined by photonic channel 216 that includes microrings present at the border of the optical pump pattern emitted by the spatial light modulator. Using such a pattern enables input light port 218 to be established in the photonic lattice (note: any site ring in the photonic channel 216 can be designated as an output port).

Figure 3:
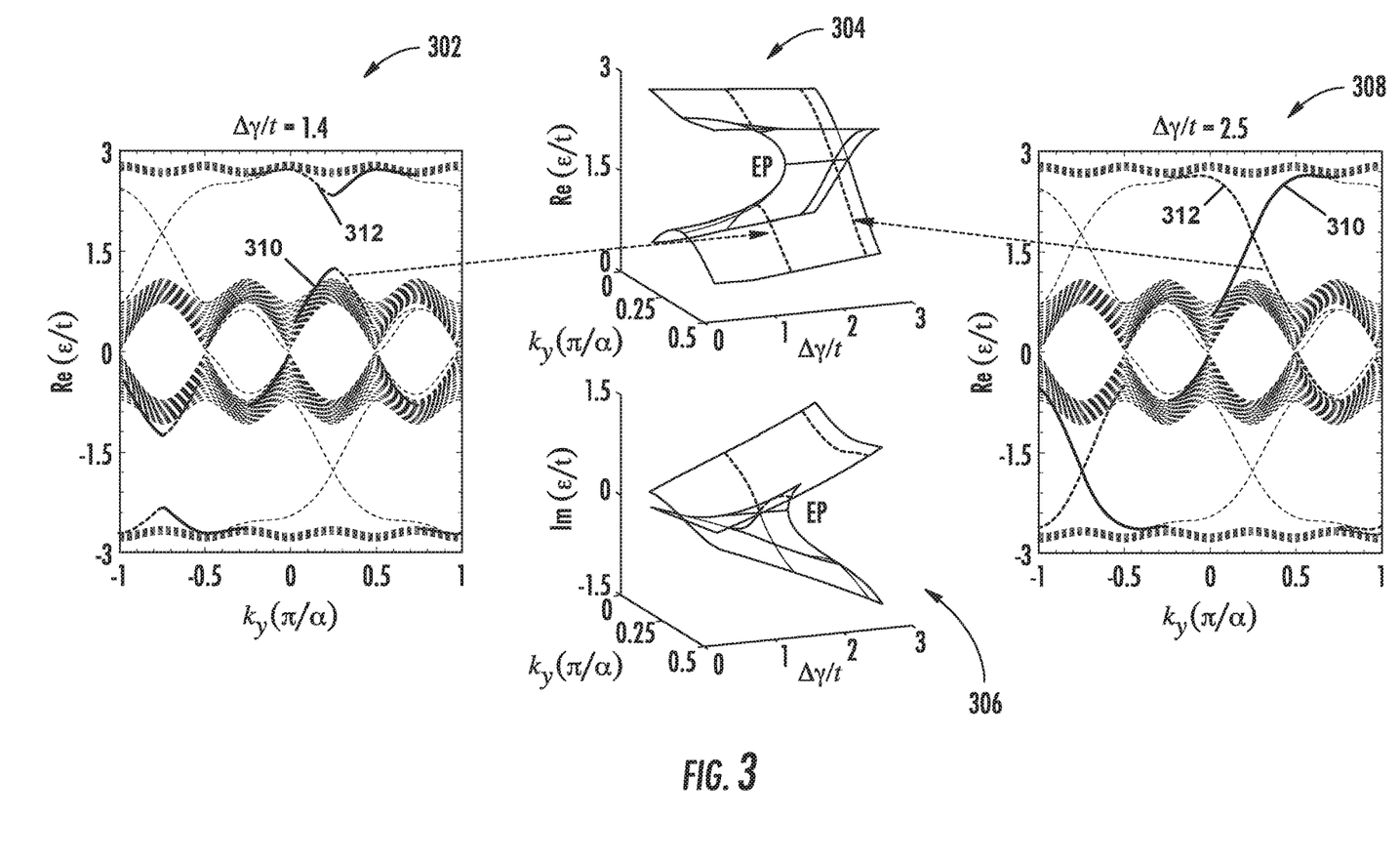
FIG. 3 is a schematic diagram that illustrates the emergence of a topological interface state via a non-Hermitian phase transition according to an embodiment of the subject matter described herein.

In the Hermitian limit, the topological insulating nature is engineered by the encircling phase $\varphi=\pi/2$, which emulates the spin-independent magnetic flux threading a two-dimensional (2D) electron gas. The nontrivial phase can open bandgaps where the interior structure of the photonic lattice is insulating due to destructive interference, whereas the pseudo-spin dependent one-way edge-transport channels (which are created by the boundary existing between the gain and loss domains created by optical pumping) are protected. When each microring is characterized with either a gain or loss, the Hamiltonian in the pseudospin subspace is represented as:

$$H_{\uparrow\downarrow \atop 1,2} = -t\sum_{m,n}\left(a_{m+1,n}^{\dagger}a_{m,n} + e^{im\varphi_{\uparrow\downarrow}}a_{m,n+1}^{\dagger}a_{m,n} + h.c.\right) - i\gamma_{1,2}a_{m,n}^{\dagger}a_{m,n}$$

where t is the coupling between two site rings controlled by the ring-to-ring separation, (m, n) labels the lattice sites in the (x, y) direction, $a(a^{\dagger})$ is the bosonic creation (annihilation) operator in the lattice site, $\varphi_{\uparrow\downarrow}$ is the pseudospin-dependent encircling phase, and h.c. denotes the Hermitian conjugate, and $\gamma_1$ (>0) and $\gamma_2$ (<0) denote the gain and loss coefficients, respectively. The topological property of the system is not altered with uniform linear gain or loss, and therefore any states in the interior are prohibited in the bandgaps. However, with a non-Hermitian gain-loss junction, imbalanced field amplitude is produced between the light circulating across the two domains, leading to the breakdown of destructive interference at the interfacial site rings. With a moderate gain-loss contrast, defined as $\Delta\gamma=\gamma_1-\gamma_2$, a pair of "pseudo" interface states emerge in each bandgap as shown in FIG. 3. Specifically, FIG. 3 is a schematic diagram that illustrates the emergence of a topological interface state via a non-Hermitian phase transition according to an embodiment of the subject matter described herein. For example, plot 302 illustrates a band structure for $\Delta\gamma=\gamma_1-\gamma_2=1.4$ t and $\varphi=\pi/2$. In addition to the edge states at the right and left physical boundaries, the emergence of two dispersive pseudo-edge states is shown near the EP degeneracies at $k_y=0.25$ $\pi/a$ (i.e., the upper band gap) and $k_y=-0.75\pi/a$ (i.e., the lower band gap). These two states are highlighted as bolded dashed lines (i.e., bold dashed lines 312 throughout FIG. 3, for example) and bold solid lines (i.e., bold solid lines 310 throughout FIG. 3), respectively.

Moreover, the depicted counter-propagating edge states strongly couple before the closure of the bandgap and therefore are not topologically protected. By increasing the gain-loss contrast, the gap between the emerging states diminishes once they cross at the symmetry point in the reciprocal space, where the two eigenstates coalesce to one singularity (i.e., EP) as shown in plot 304 of FIG. 3. Specifically, plot 304 depicts Reimann sheets of the real (Re) an imaginary (Im) parts of the eigenspectrum, with varying gain-loss contrast and momentum, near the EP degeneracy at ($k_y=0.25$ $\pi/a$, $\Delta\gamma=1.785$ t, $\gamma_1=-\gamma_2$) in the upper bandgap.

Further tuning the gain-loss contrast across the EP leads to a non-Hermitian phase transition where two newly emerged gapless interface states decouple with each other, becoming topologically chiral and carrying two different pseudospins as shown in plot 308 of FIG. 3. Specifically, plot 308 depicts a band structure for showing two new anti-crossing interface states that counter propagate at the gain-loss boundary of the photonic lattice. The state represented by the red curve becomes amplified, whereas the state denoted by the black curve become strongly attenuated during propagation. The epsilon denotes the eigenenergy.

In some embodiments, a new topological interface state emerges via non-Hermitian control, which is biased to the gain domain and dominant over that on the loss side. With a large value of $\Delta\gamma/t$ (such as >5 in studies related to the disclosed subject matter, which is sufficiently above the EP), the non-Hermitian chiral state possesses nearly the same modal characteristics as the original topological edge state, thereby leading to efficient coupling between the two states when the topological light pathway turns from the edge into the bulk of the photonic lattice.

Figure 4:
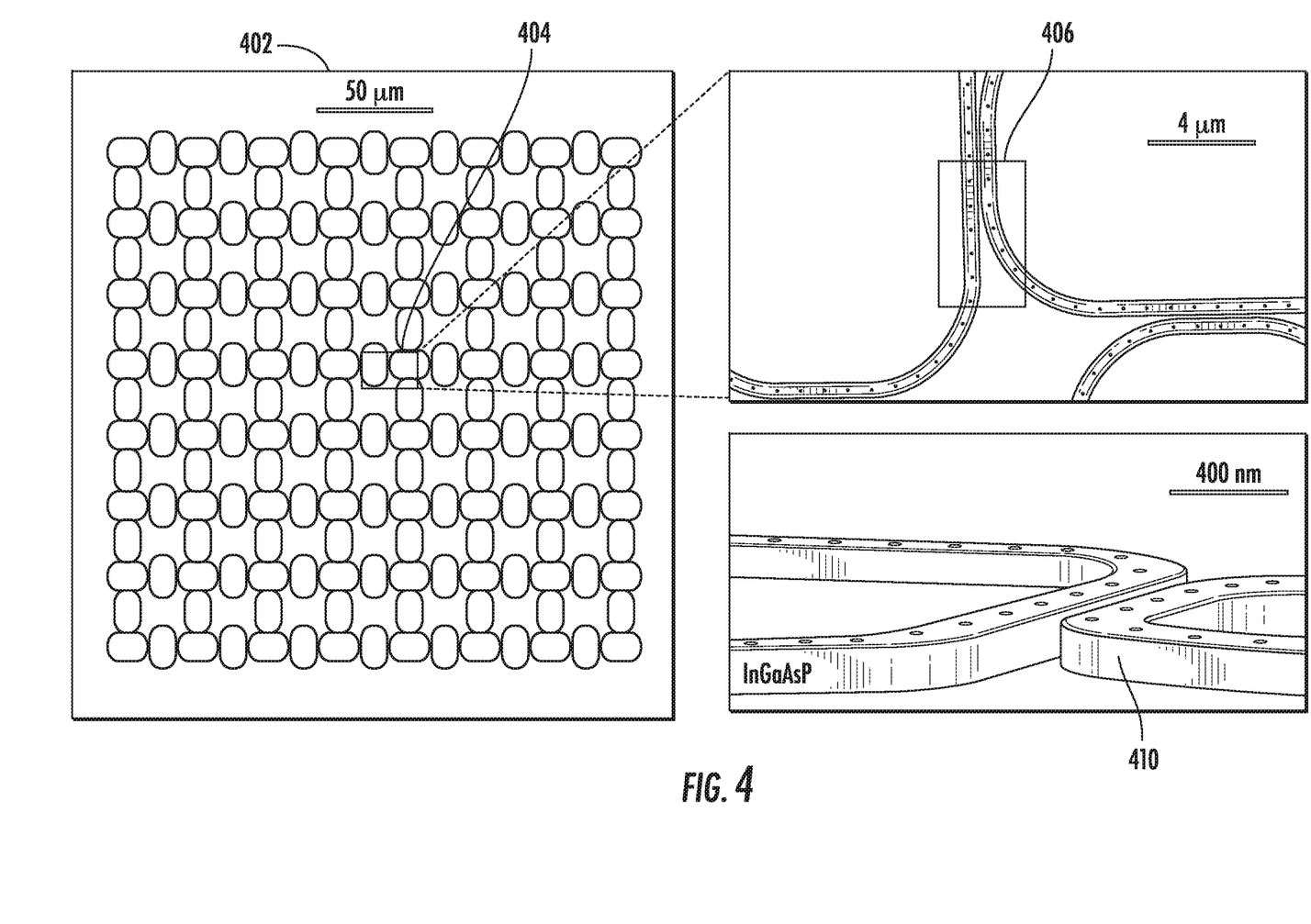
FIG. 4 depicts a scanning electron microscopy (SEM) image of a photonic topological insulator according to an embodiment of the subject matter described herein.

In some embodiments, the photonic topological lattice may be fabricated on an InGaAsP multiple-quantum well platform by using electron beam lithography as shown in FIG. 4. Notably, FIG. 4 depicts a scanning electron microscopy (SEM) image of a photonic topological insulator according to an embodiment of the subject matter described herein. More specifically, FIG. 4 illustrates a representation of a SEM image 402 of the photonic topological insulator on the InGaAsP platform with an 8×8 area of site rings (i.e., before transfer to a class substrate). Image section 404 is a zoom-in SEM image showing the shallow scattering holes measuring 100 nm in diameter. In some embodiments, shallow nanoholes are intentionally implemented on top of site rings to sample the in-plane circulation of guided light in the far field (as shown in box 406).

Figure 5:
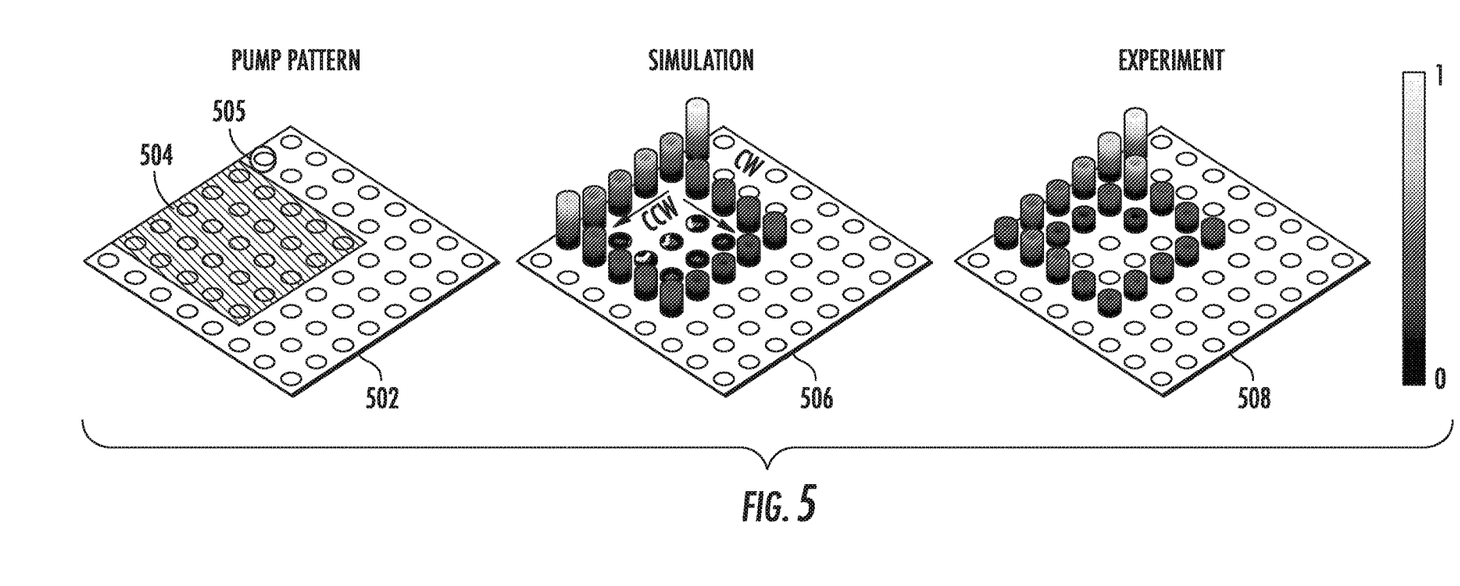
FIG. 5 is a schematic diagram that depicts a uniform square pump pattern and its related field amplitude distribution according to an embodiment of the subject matter described herein.

In some embodiments, a uniform 200 nanometer (nm) edge-to-edge separation between the site rings and their adjacent link rings (e.g., see adjacent link ring 410 in FIG. 4) opens two 70-GHz-wide bandgaps (e.g., see plots 302 and 308 in FIG. 3). Part of the photonic topological lattice was optically pumped and can be flexibly patterned to form any arbitrary topological light pathway inside the bulk of the lattice via a spatial light modulator (SLM). The intensity of the pumping beam can be precisely tuned just below the lasing threshold, thus offering a sufficient gain-loss contrast at the boundary of the pumping area to form the chiral non-Hermitian topological interface state while avoiding nonlinear gain saturation in each microring. To validate the new topological route along the non-Hermitian heterojunction, a uniform square pattern can be created that marginally covers a 5-by-5 subarea of site rings as shown in FIG. 5. FIG. 5 is a schematic diagram that depicts a uniform square pump pattern and its related field amplitude distribution according to an embodiment of the subject matter described herein. Specifically, FIG. 5 illustrates a photonic lattice 502 in which a square pump pattern 504 is formed by a spatial light modulator that covers the 5×5 subarea of the site rings and the synchronized pump beam at induces the lasing incidence (as shown by circle 505). In some embodiments, the lasing incidence circle 505 (e.g., a lasing site ring) is designated as the input light port for photonic lattice 502. Further, an output port can be any one of the site rings positioned along a pump-defined gain/loss boundary. For example, referring to FIG. 5, one of the site rings at the edges of the square pump pattern 504 (i.e., shaded region) can be designated as an output port. Owing to the intrinsic amplification nature, another advantage of the disclosed InGaAsP platform is that each site ring can also act as an on-chip light source, feeding light into the photonic topological lattice. To make full use of this advantage, the light wave to probe the non-Hermitian-controlled topological edge states can be launched from the periphery site ring next to the square shaped pumping area, with a separate synchronized pumping beam above lasing threshold. Owing to the time-reversal symmetry of a single microring, both clockwise and counterclockwise modes lase in the site ring. Because the two topological modes correspond to two pseudospins of the photonic topological lattice, the two modes (e.g., emerging at the pump-defined gain/loss boundary) couple along the two edges of the pumping region according to their synthetic magnetic fields, respectively, topologically turning around the pump-defined (instead of structural) corners without any scattering loss as shown in the simulation lattice 506 and experiment lattice 508. More specifically, simulation lattice 506 demonstrates simulated field amplitude distribution wherein the arrows show the corresponding clockwise and counterclockwise propagation directions. Similarly, experiment lattice 508 demonstrates experimentally measured field amplitude at the lasing wavelength of 1486 nm. Each plotted cylinder represents the corresponding site ring in the fabricated microring array. The existence of the edge states is guaranteed by the topological protection, despite imperfect fabrication possibly creating a slight discrepancy between simulations and experiments the affected in FIG. 5.

Figure 6:
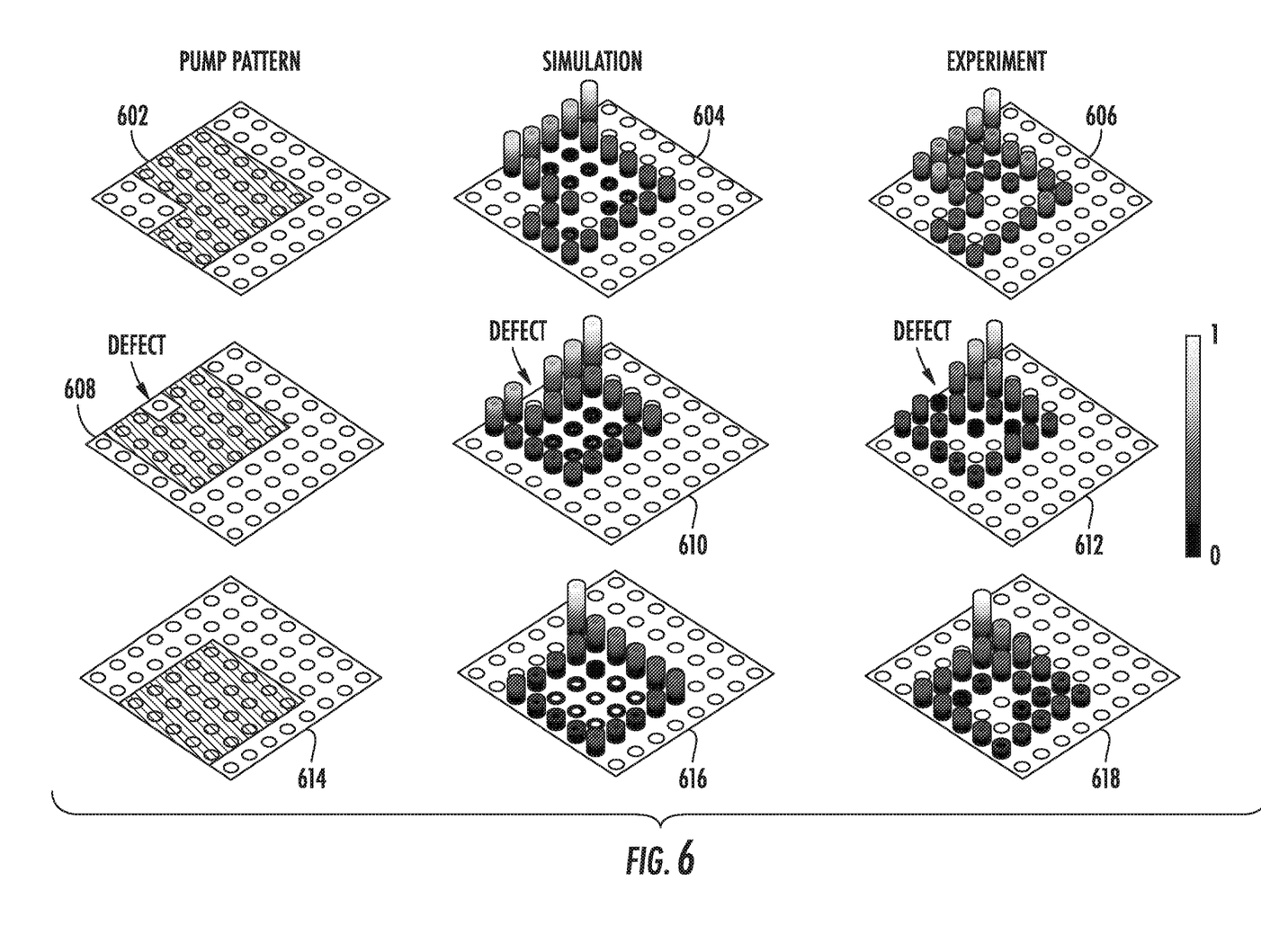
FIG. 6 is a schematic diagram that depicts a demonstration of arbitrarily reconfigurable topological light channels according to an embodiment of the subject matter described herein.

The virtue of the non-Hermitian-controlled topological light path is the convenient reconfiguration along any arbitrary shape to steer topological light within the entire footprint of the lattice. To demonstrate such versatile topological light steering, the pumping pattern was switched from a square shape to an L shape as shown in FIG. 6. FIG. 6 is a schematic diagram that depicts a demonstration of a plurality of arbitrarily reconfigurable topological light channels according to an embodiment of the subject matter described herein. More specifically, photonic lattice depictions 602-606 respectively illustrate a pump pattern lattice, a simulation lattice, and an experiment lattice that correspond to the aforementioned L-shaped pumping pattern. The associated light steering enables the input beam propagation along the newly formed topological domain boundaries despite the increase of turning corners in the reconfigured pumping area. The disclosed non-Hermitian-controlled reconfigurable light-transport scheme is inherently of topological robustness against defects. Even though a defect is intentionally created along the structural edge by a notched square pumping pattern as shown in photonic lattice depictions 608-612 in FIG. 6, the incident light detours around the defect ring without noticeable intensity drop and back reflection. More specifically, lattice depiction 608 is a notched square pump pattern that leaves a periphery site ring passive and creates a defect and lattice depiction 610 is a simulated light propagation that turns around the induced defect along the non-Hermitian defined boundary. Further, lattice depiction 612 represents an experimentally observed routing effect in the presence of the defect. Furthermore, because the pumping can locate the transport channel anywhere in the bulk, the light signal is allowed to take place at any site ring and be topologically guided. An example of this aspect can be demonstrated by moving the excitation to an interior site ring as shown in lattice depictions 614-618 where the generated lasing beam was coupled with the topological states and guided along the pumping-defined perimeters. For example, lattice depiction 614 demonstrates bulk excitation by pumping the interior site ring and lattice depiction 616 illustrates a simulated field distribution with the interior incidence. Further, lattice depiction 618 illustrates an experimentally observed topological light transport with the interior incidence. This is in stark contrast to the prior passive photonic topological insulators, in which the topological edge states can only be accessed when probed from the edge, owing to the insulating bulk.

Active topological light steering along any arbitrary route in a photonic integrated circuit via non-Hermitian control of patterned gain-loss distribution can be demonstrated. The non-Hermitian manipulation redefines the topological domain wall without altering the topological order of the structure, which would be otherwise static. The ultra-flexible nature of non-Hermitian topological light control is general and applies to other photonic topological insulators with the size of the unit cell at the wavelength scale. The achievable functions can cover a variety of photonic components and networks beyond light steering and routing, thereby holding promise for the development of integrated photonic circuitry for high-density data processing.

Figure 7:
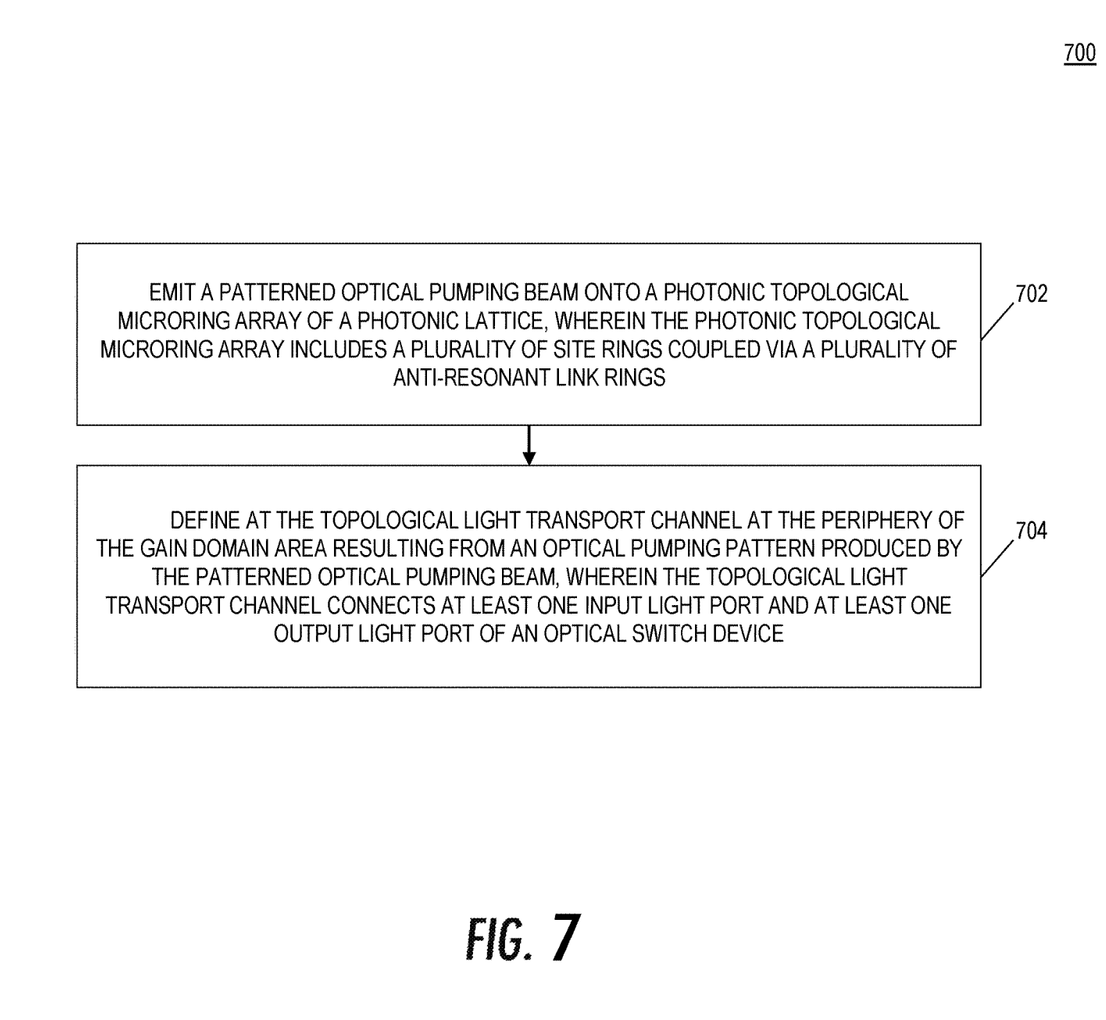
FIG. 7 is an exemplary flowchart of a process for defining a topological light transport channel in a photonic lattice according to an embodiment of the subject matter described herein.

FIG. 7 is a schematic block diagram illustrating an exemplary process 700 for defining a topological light transport channel in a photonic lattice according to an embodiment of the subject matter described herein. In some embodiments, process 700 can involve an algorithm stored in memory of a computing device and performs blocks 702-704 when executed by a processor of the computing device.

In block 702, a patterned optical pumping beam is emitted onto a photonic topological microring array of a photonic lattice. In some embodiments, the photonic topological microring array includes a plurality of site rings coupled via a plurality of anti-resonant link rings. Notably, the arrangement of the coupled plurality of site rings coupled and plurality of anti-resonant link rings may produce a topological feature of the topological light transport channel.

In block 704, the topological light transport channel is defined at the periphery of the gain domain area resulting from an optical pumping pattern produced by the patterned optical pumping beam. In some embodiments, the topological light transport channel connects at least one input light port and at least one output light port of an optical switch device. In some embodiments, the topological light transport channels can be dynamically changed by adjusting the patterned optical pumping beam that is emitted onto the photonic lattice. In some examples, an optical pumping pattern produced by the emitted patterned optical pumping beam is dynamically configured by a spatial light modulator. Also, non-Hermitian control can be utilized to steer the topological light transport channel on the photonic lattice in some embodiments.

Figure 8:
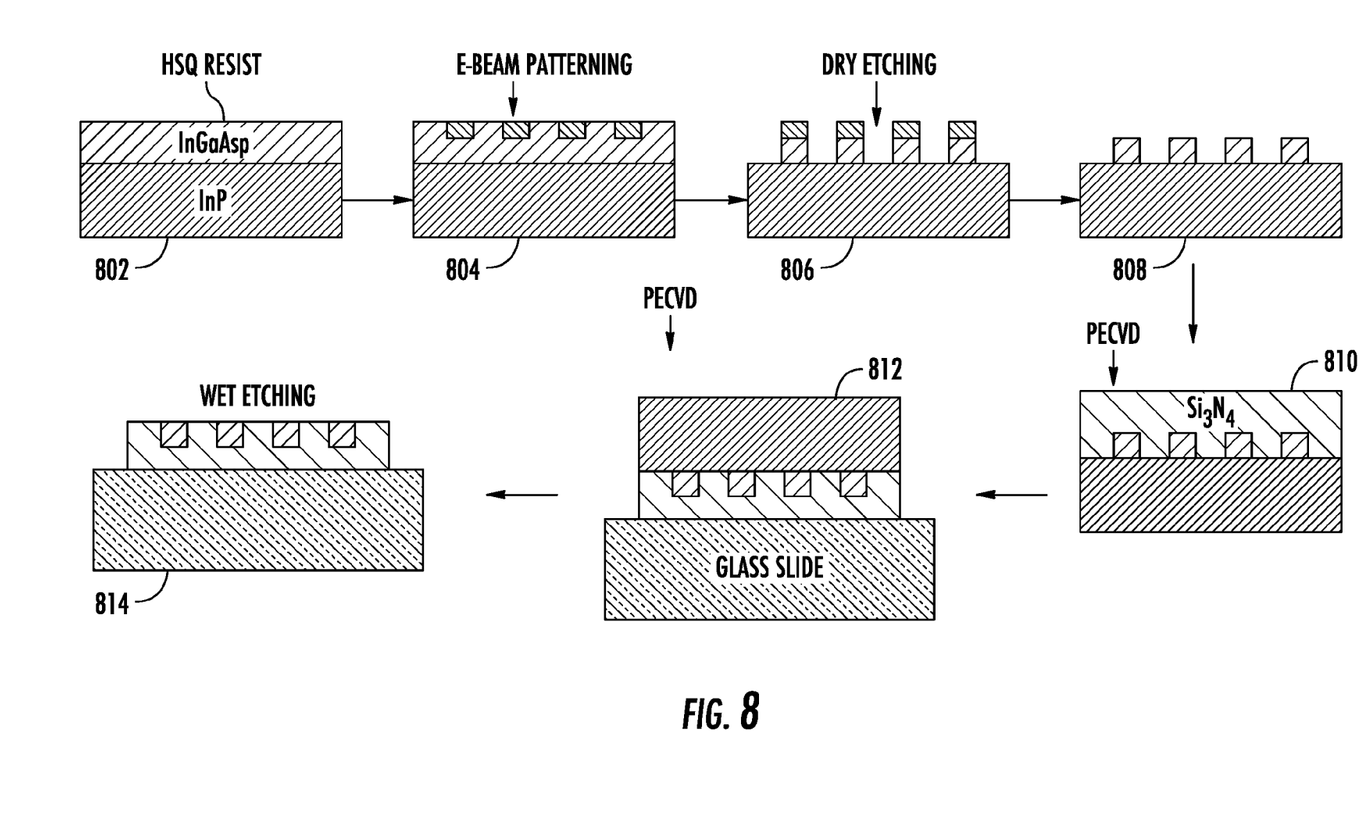
FIG. 8 is a block diagram depicting the fabrication of a photonic topological micro lattice on an active platform according to an embodiment of the subject matter described herein.

FIG. 8 is a block diagram depicting the fabrication of a photonic topological micro lattice on an active platform according to an embodiment of the subject matter described herein. In some embodiments, the photonic topological microring lattice is fabricated on an active platform. For example, the photonic topological microring lattice can be fabricated using electron-beam lithography and plasma etching techniques. In some embodiments, hydrogen silsesquioxane (HSQ) solution in methyl isobutyl ketone (MIBK) can be used as negative electron beam lithography resist to pattern the structure (see block 802). The concentration ratio of HSQ (FOX15) and MIBK can be adjusted such that a layer of resist can be thick enough as an etching mask after exposure and developing. In some embodiments, the structure can be patterned by electron beam exposure, where electrons convert the resist to an amorphous structure (see block 804). The patterned wafer may then be developed using tetramethylammonium hydroxide (TMAH) solution (MFCD-26) and rinsed in deionized water. The exposed and developed resist can serve as a mask for the subsequent inductively coupled plasma etching process, which can be done by BCl3: Ar plasma (see block 806). After dry etching, the resist is removed by immersing the sample in buffered oxide etchant (BOE) (see block 808), followed by deposition of a 3-μm thick Si3N4 (silicon nitride) coating by PECVD (see block 810). The wafer can then be bonded to a piece of glass slide as the substrate (see block 812). Finally, the InP layer was selectively removed by wet etching with a mixture of HCl (Hydrochloride acid) and H3PO4 (Phosphoric acid) (see block 814).

Advantages afforded by the disclosed subject matter include the integration of input and output ports in a smaller area of a switch as opposed to traditional application specific integrated circuits used in the present art. In addition, the topological light path that is generated by the disclosed subject matter is extremely reliable and can function independently of any defect or disorder that may be exhibited by traditional circuits. As such, the disclosed subject matter provides a switching device that can be readily configured to provide extremely reliable optical data transfers.

It will be understood that various details of the presently disclosed subject matter may be changed without departing from the scope of the presently disclosed subject matter. Furthermore, the foregoing description is for the purpose of illustration only, and not for the purpose of limitation.

REFERENCES

All references listed in the instant disclosure, including but not limited to all patents, patent applications and publications thereof, scientific journal articles, and database entries are incorporated herein by reference in their entireties to the extent that they supplement, explain, provide a background for, or teach methodology, techniques, and/or embodiments employed herein.

1. W. Dally, B. Towles, *Principles and Practices of Interconnection Networks* (Elsevier, 2004).
2. F. Testa, L. Pavesi, *Optical Switching in Next Generation Data Centers* (Springer, 2016).
3. T. Ozawa et al., *Rev. Mod. Phys.* 91, 015006 (2019).
4. M. Hafezi, E. A. Demler, M. D. Lukin, J. M. Taylor, *Nat. Phys.* 7, 907-912 (2011).
5. M. Hafezi, S. Mittal, J. Fan, A. Migdall, J. M. Taylor, *Nat. Photonics* 7, 1001-1005 (2013).
6. M. C. Rechtsman et al., *Nature* 496, 196-200 (2013).
7. A. B. Khanikaev et al., *Nat. Mater.* 12, 233-239 (2013).
8. J.-W. Dong, X.-D. Chen, H. Zhu, Y. Wang, X. Zhang, *Nat. Mater.* 16, 298-302 (2017).
9. M. I. Shalaev, W. Walasik, A. Tsukernik, Y. Xu, N. M. Litchinitser, Nat. Nanotechnol. 14, 31-34 (2019).
10. B. Yang et al., *Science* 359, 1013-1016 (2018).
11. C. Poli, M. Bellec, U. Kuhl, F. Mortessagne, H. Schomerus, *Nat. Commun.* 6, 6710 (2015).
12. P. St-Jean et al., *Nat. Photonics* 11, 651-656 (2017).
13. B. Bahari et al., *Science* 358, 636-640 (2017).
14. M. A. Bandres et al., *Science* 359, eaar4005 (2018).
15. S. Klembt et al., *Nature* 562, 552-556 (2018).
16. S. Barik et al., *Science* 359, 666-668 (2018).
17. S. Mittal, E. A. Goldschmidt, M. Hafezi, *Nature* 561, 502-506 (2018).
18. A. Blanco-Redondo, B. Bell, D. Oren, B. J. Eggleton, M. Segev, *Science* 362, 568-571 (2018).
19. M. Jung, Z. Fan, G. Shvets, *Phys. Rev. Lett.* 121, 086807 (2018).
20. D. Leykam, S. Mittal, M. Hafezi, Y. D. Chong, *Phys. Rev. Lett.* 121, 023901 (2018).
21. Z. A. Kudyshev, A. V. Kildishev, A. Boltasseva, V. M. Shalaev, *Nanophotonics* 8, 1349-1356 (2019).
22. M. I. Shalaev, W. Walasik, N. M. Litchinitser, *Optica* 6, 839 (2019).
23. X. Cheng et al., *Nat. Mater.* 15, 542-548 (2016).
24. L. Feng, R. El-Ganainy, L. Ge, *Nat. Photonics* 11, 752-762 (2017).
25. B. Peng et al., *Nat. Phys.* 10, 394-398 (2014).
26. J. Doppler et al., *Nature* 537, 76-79 (2016).
27. D. Leykam, K. Y. Bliokh, C. Huang, Y. D. Chong, F. Nori, *Phys. Rev. Lett.* 118, 040401 (2017).
28. K. Takata, M. Notomi, *Phys. Rev. Lett.* 121, 213902 (2018).
29. H. Zhou et al., *Science* 359, 1009-1012 (2018).

What is claimed is:
1. An optical switch device comprising:
a photonic lattice including a photonic topological microring array comprising a plurality of site rings coupled via a plurality of anti-resonant link rings;
a plurality of input light ports and a plurality of output light ports located at the plurality of site rings, wherein the plurality of input light ports and the plurality of output light ports are respectively connected by a plurality of topological light transport channels; and a spatial light modulator located between a light source and the photonic lattice for producing an optical pumping beam that forms an optical pumping pattern of a desired shape on the photonic lattice that defines a gain domain on the photonic lattice, the shape of the optical pumping pattern having a border and the optical pumping pattern creating a topological light transport channel through the site rings along the border.

2. The optical switch device of claim 1 wherein a shape of the topological light transport channel is dynamically changeable by adjusting the shape of the optical pumping pattern created by the optical pumping beam on the photonic lattice.

3. The optical switch device of claim 1 wherein an area on the photonic lattice that is not subjected to the optical pumping pattern results in a distributed loss domain.

4. The optical switch device of claim 1 wherein an arrangement of the coupled plurality of site rings coupled and plurality of anti-resonant link rings produces a topological feature of the topological light transport channels.

5. The optical switch device of claim 1 wherein the photonic topological microring array is composed of an Indium gallium arsenide phosphide (InGaAsP) material.

6. The optical switch device of claim 1 wherein non-Hermitian control is utilized to steer the topological light transport channel on the photonic lattice.

7. A method for defining a topological light transport channel in a photonic lattice comprising:

providing a photonic lattice including a photonic topological microring array comprising a plurality of site rings coupled via a plurality of anti-resonant link rings, a plurality of input light ports and a plurality of output light ports located at the plurality of site rings, wherein the plurality of input light ports and the plurality of output light ports are respectively connected by a plurality of topological light transport channels;

emitting light through a spatial light modulator to produce an optical pumping beam that forms an optical pumping pattern of a desired shape on the photonic topological microring array of the photonic lattice, the shape of the optical pumping pattern defining a gain domain on the photonic lattice, the shape of the optical pumping pattern having a border and the optical pumping pattern creating a topological light transport channel through the site rings along the border; and wherein the topological light transport channel connects at least one input light port and at least one output light port of an optical switch device.

8. The method of claim 7 comprising dynamically adjusting a shape of the light transport channel by adjusting the shape of the optical pumping pattern that is emitted onto the photonic lattice.

9. The method of claim 7 wherein an area on the photonic lattice that is not subjected to the optical pumping pattern results in a distributed loss domain.

10. The method of claim 7 wherein an arrangement of the coupled plurality of site rings coupled and plurality of anti-resonant link rings produces a topological feature of the topological light transport channel.

11. The method of claim 7 wherein the photonic topological microring array is composed of an Indium gallium arsenide phosphide (InGaAsP) material.

12. The method of claim 7 wherein non-Hermitian control is utilized to steer the topological light transport channel on the photonic lattice.

* * * * *